(12) United States Patent
Martin et al.

(10) Patent No.: US 10,947,920 B2
(45) Date of Patent: Mar. 16, 2021

(54) METHOD AND SYSTEM FOR MONITORING SOOT PRODUCTION

(71) Applicant: Ford Global Technologies, LLC, Dearborn, MI (US)

(72) Inventors: Douglas Raymond Martin, Canton, MI (US); Kenneth James Miller, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 431 days.

(21) Appl. No.: 15/715,129

(22) Filed: Sep. 25, 2017

(65) Prior Publication Data

US 2019/0093584 A1 Mar. 28, 2019

(51) Int. Cl.

| | | |
|---|---|---|
| *F02D 41/14* | (2006.01) | |
| *F02D 35/02* | (2006.01) | |
| *B60W 20/16* | (2016.01) | |
| *F02P 23/04* | (2006.01) | |
| *G01N 15/06* | (2006.01) | |
| *G06K 9/64* | (2006.01) | |
| *F02P 5/15* | (2006.01) | |
| *G01N 15/00* | (2006.01) | |

(52) U.S. Cl.
CPC ......... *F02D 41/1467* (2013.01); *B60W 20/16* (2016.01); *F02D 35/022* (2013.01); *F02D 41/1446* (2013.01); *F02P 23/04* (2013.01); *G01N 15/06* (2013.01); *G06K 9/64* (2013.01); *F02D 2200/0602* (2013.01); *F02D 2200/101* (2013.01); *F02D 2200/1002* (2013.01); *F02P 5/1506* (2013.01); *G01N 2015/0046* (2013.01); *G01N 2015/0693* (2013.01)

(58) Field of Classification Search
CPC ............ B60W 20/16; F02D 2200/0602; F02D 2200/1002; F02D 2200/101; F02D 35/022; F02D 41/1446; F02D 41/1467; F02P 23/04; F02P 5/1506; G01N 15/06; G01N 2015/0046; G01N 2015/0693; G06K 9/64
See application file for complete search history.

(56) References Cited

U.S. PATENT DOCUMENTS 4,380,986 A * 4/1983 Latsch ............... F02D 41/0065
123/687
6,044,642 A * 4/2000 Nishimura ........... F02D 41/024
60/285

(Continued)

OTHER PUBLICATIONS

"Engines fire without smoke: Car manufacturers could clean up vehicle exhausts using a new model of gasoline combustion developed using experimental data," KAUST Discovery Website, Available Online at https://discovery.kaust.edu.sa/en/article/357/engines-fire-without-smoke, May 27, 2017, 4 pages.

*Primary Examiner* — Redhwan K Mawari
(74) *Attorney, Agent, or Firm* — Geoffrey Brumbaugh; McCoy Russell LLP (57) ABSTRACT

Methods and systems are provided for using an engine laser ignition system to take images, in real-time, of a cylinder during combustion and estimate cylinder soot generation. If excess soot generation is determined, cylinder fueling is adjusted by varying an injection pressure, amount, and ratio. An air-fuel ratio of the cylinder is also adjusted in view of exhaust temperature constraints to reduce soot generation.

11 Claims, 4 Drawing Sheets

(56) References Cited

U.S. PATENT DOCUMENTS

| | | | |
|---|---|---|---|
| 9,222,455 B2 * | 12/2015 | Martin | F02P 23/04 |
| 9,617,967 B2 | 4/2017 | Martin et al. | |
| 2009/0272362 A1 * | 11/2009 | Yun | F02B 1/12 |
| | | | 123/295 |
| 2012/0097126 A1 * | 4/2012 | Kumano | F02D 13/0219 |
| | | | 123/294 |
| 2014/0081556 A1 * | 3/2014 | Estefanous | F02D 41/1467 |
| | | | 701/103 |
| 2014/0214306 A1 * | 7/2014 | Badillo | F02D 19/08 |
| | | | 701/104 |
| 2014/0316621 A1 * | 10/2014 | Martin | G01M 15/042 |
| | | | 701/22 |
| 2015/0005997 A1 * | 1/2015 | Martin | F02P 23/04 |
| | | | 701/22 |
| 2016/0131091 A1 * | 5/2016 | Kaneko | F01N 3/22 |
| | | | 60/285 |
| 2016/0215706 A1 * | 7/2016 | Glugla | F02D 15/02 |
| 2016/0245221 A1 * | 8/2016 | McEwan | F02D 41/38 |
| 2019/0093584 A1 * | 3/2019 | Martin | G06K 9/64 |

* cited by examiner

METHOD AND SYSTEM FOR MONITORING SOOT PRODUCTION

FIELD

The present application relates to monitoring cylinder soot production in an engine configured with a laser ignition system.

BACKGROUND AND SUMMARY

Feed-gas soot production may be used as a parameter indicative of engine operation efficiency. For example, elevated feed-gas soot production may indicate excessive richness of a combustion air-fuel ratio or misrouting of a fuel injector spray onto cylinder walls or piston. As engine components age over time, as well as due to part-to-part variability, soot production may increase compared to a nominal value. Excess soot production may degrade exhaust emissions and require mitigating actions to be made to fuel injection to reduce soot formation. Additionally, vehicle designs may have to be updated with particulate filters in the exhaust passage to lower exhaust soot levels.

Various methods may be used to determine feed-gas soot production. For example, observations from an engine dynamometer map may be used to model feed-gas soot production. Other approaches include the use of an exhaust soot or a differential pressure sensor for estimating soot accumulation on an exhaust filter (such as based on a pressure drop across the filter), and inferring feed-gas soot production based on filter soot accumulation. The inventors herein have recognized that such approaches can add cost and complexity without necessarily enhancing the accuracy of soot measurement. In addition, ash can add a permanent pressure drop across the filter, confounding the results. In view of these issues, the inventors have realized that in engine systems configured with laser ignition capabilities, components of the laser ignition system can be advantageously used to monitor cylinder combustion and determine feed-gas soot production, in real-time. In one example, soot estimated may be performed by a method comprising: adjusting cylinder fueling responsive to an amount of soot generated in a cylinder, the amount estimated at a controller based on an image generated through a laser ignition device. In this way, if elevated soot production is determined, appropriate mitigating actions can be taken substantially immediately.

As an example, the optics of a laser ignition system can be used to diagnose a cylinder combustion event for excess soot production. The lasers may be used to rapidly sweep the interior of each cylinder. In particular, low power light pulses may be emitted by the laser ignition device into the cylinder and detected by a photodetection system coupled to the head of the cylinder. The light pulses may start to be emitted once a threshold combustion phasing is completed (such as after 50% combustion phasing) and continued until the exhaust stroke is completed. The photodetection system may include a camera (such as a CCD camera) and a lens (such as a fish-eye lens), for detecting the light pulses. The light pulses may illuminate soot particles formed in the cylinder during a combustion event. In one example, the light pulses may be emitted in the infra-red (IR) spectrum by the laser ignition device, and detected in the IR spectrum by the camera. Images of soot particle generation in the interior of the cylinder after the combustion may be generated based on the detected pulses. The images may be transmitted (e.g., wirelessly) within the engine system and displayed to a service provider (e.g., mechanic or vehicle operator) on a display of a vehicle center-console. In addition, a reference image of soot generation in the cylinder at the given operating conditions (e.g., at the given engine speed-load condition) may be retrieved from the controller's memory and displayed to the mechanic for comparative analysis. Optionally, if the engine is coupled in a hybrid electric vehicle, an electric motor may be operated during engine operation to maintain engine speed-load conditions while the in-cylinder images are generated. In one example, based on the comparison, the generated image may be indicative of excess soot formation at the given conditions. If the mechanic determines that the generated image is indicative of excess soot formation, the mechanic may indicate the same to the controller via the display device. Accordingly, a diagnostic code may be set and fuel injection parameters may be adjusted to reduce further soot formation. For example, if the cylinder was operating rich for temperature control, a degree of enrichment may be reduced. As another example, if the cylinder was operating at stoichiometry, fuel injection pressure may be increased.

In this way, it may be possible to take advantage of a laser ignition system to reduce the time and cost associated with the determination of cylinder soot formation, without reducing the accuracy of the determination. By comparing images of cylinder soot formation, gathered by a photodetector during/following a cylinder combustion event, to a reference image, excess soot formation can be timely identified and addressed. The technical effect of using the laser of the laser ignition system to generate the images is that hardware that is already available in a laser-ignition configured engine can be leveraged for the diagnostic, reducing the need for costly sensors and filters. By identifying excess cylinder soot formation in real-time, fuel injection adjustments can be expedited.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
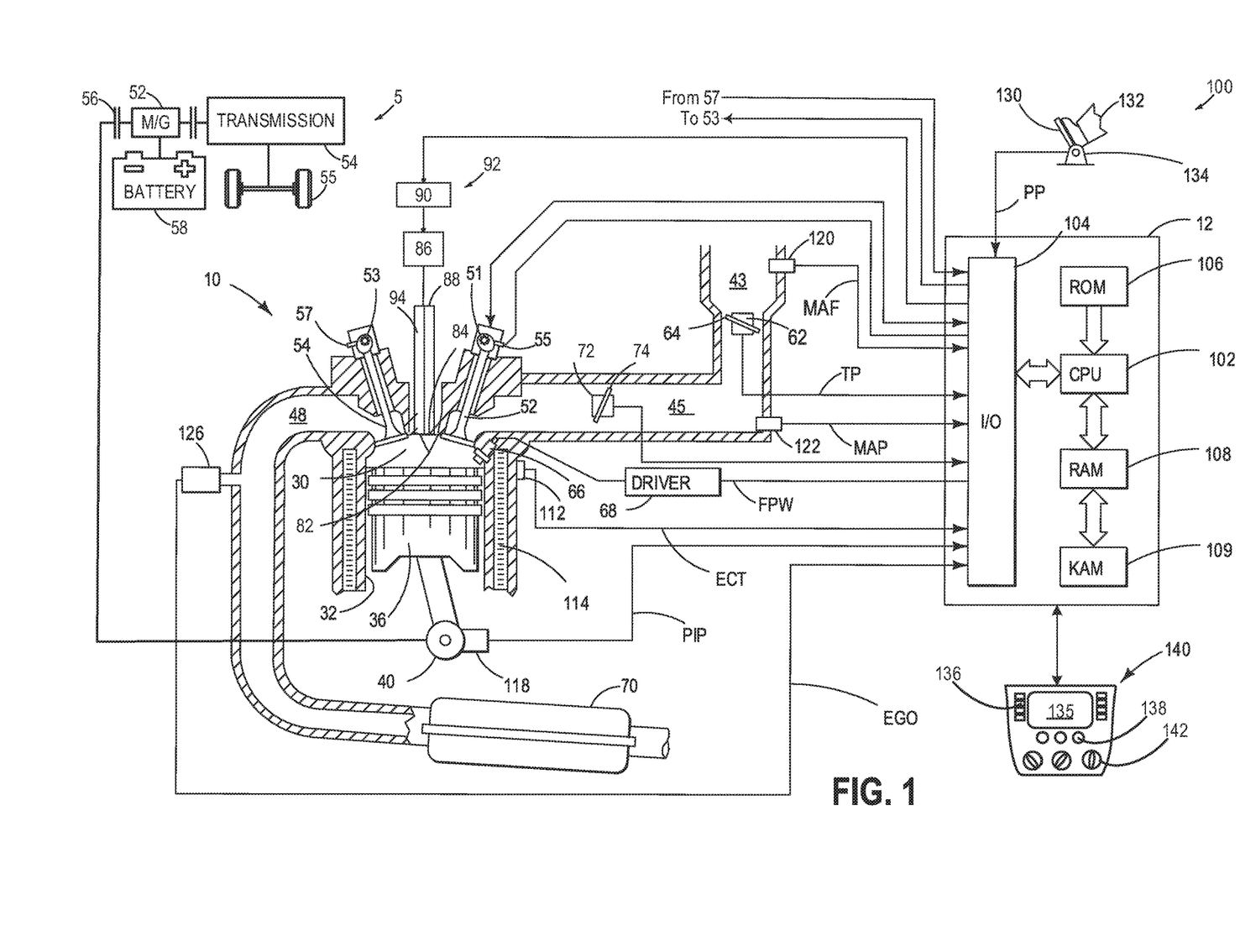
FIG. 1 shows an example combustion chamber of an internal combustion engine coupled in a hybrid vehicle system.
Figure 2:
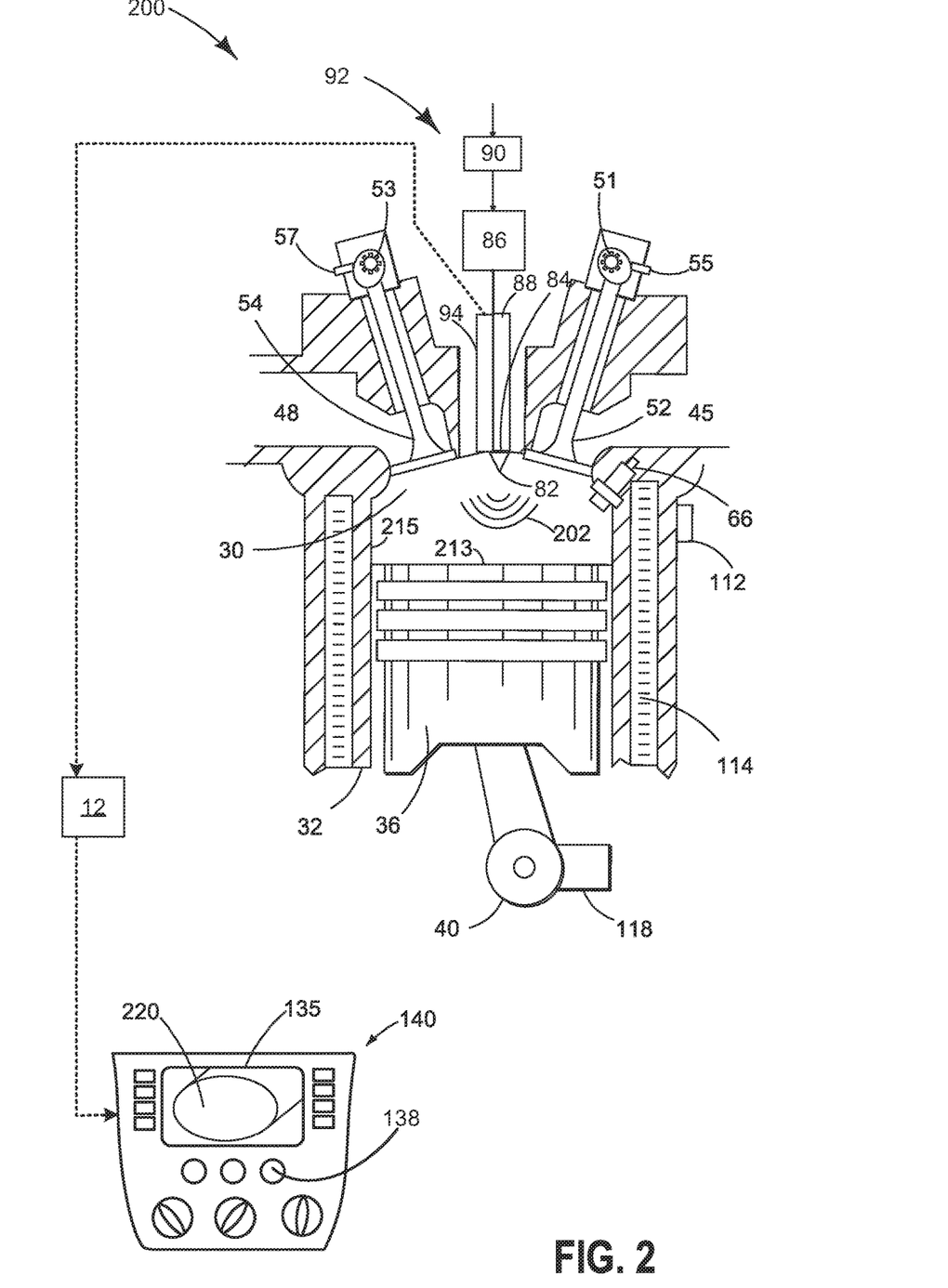
FIG. 2 shows an example of image capture and display using a laser system of the engine of FIG. 1.
Figure 3A:
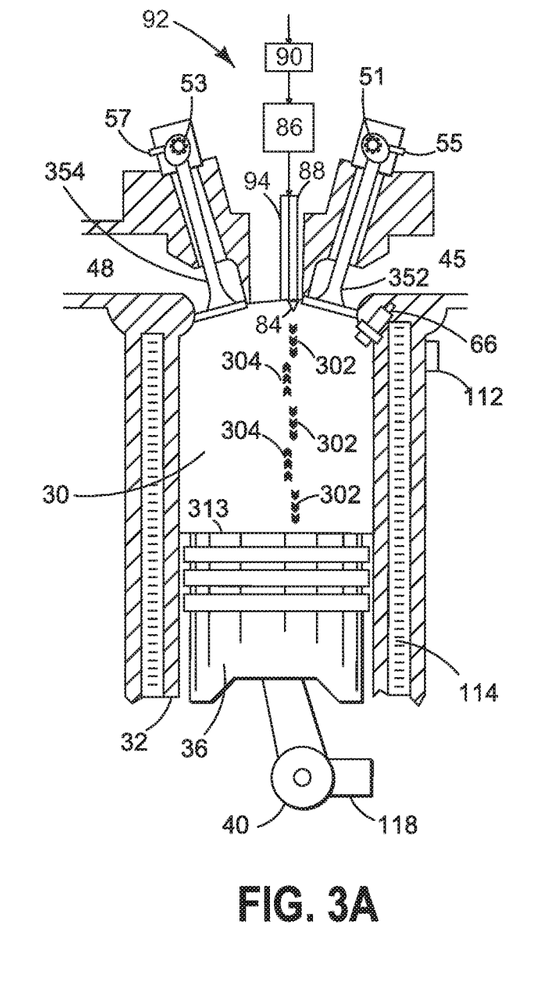
FIGS. 3A-3B show an example of laser light pulse emission to an engine cylinder.
Figure 3B:
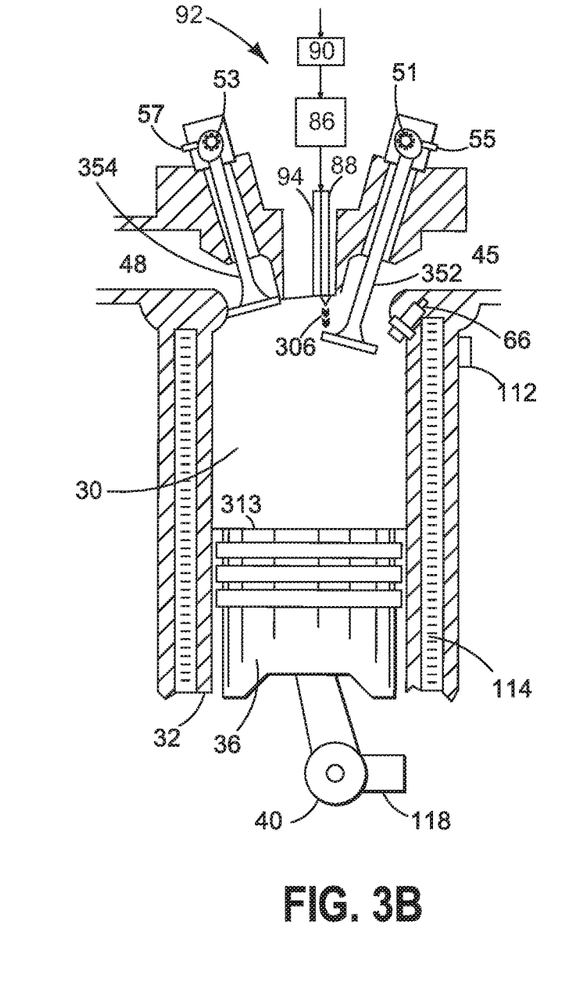

Methods and systems are provided for diagnosing cylinder soot formation using a laser ignition system, such as shown in FIG. 1. As shown at FIGS. 2 and 3A-3B, laser light pulse emission at lower intensities may be used for illuminating the interior of a cylinder while a photodetector captures in-cylinder images. Laser light pulse emission at higher intensities may also be used for initiating combustion. The generated images may be used to adjust various cylinder combustion parameters. An engine controller may be configured to perform a control routine, such as the example routine of FIG. 4, to determine excess soot formation based on in-cylinder images generated by a photodetector during a combustion event using light from laser pulse emission. According, a fuel injection profile may be adjusted to reduce further soot formation.

Turning to FIG. 1, an example hybrid propulsion system 100 is depicted. The hybrid propulsion system may be configured in a passenger on-road vehicle 5. Hybrid propulsion system 100 includes an internal combustion engine 10. The engine may be coupled to a transmission (not shown), such as a manual transmission, automatic transmission, or combinations thereof. Further, various additional components may be included, such as a torque converter, and/or other gears such as a final drive unit, etc. The hybrid propulsion system also includes an energy conversion device (not shown), which may include a motor, a generator, among others and combinations thereof. The energy conversion device may be operated to absorb energy from vehicle motion and/or the engine and convert the absorbed energy to an energy form suitable for storage at an energy storage device. The energy conversion device may also be operated to supply an output (power, work, torque, speed, etc.) to engine 10, so as to augment the engine output. It should be appreciated that the energy conversion device may, in some embodiments, include a motor, a generator, or both a motor and generator, among various other components used for providing the appropriate conversion of energy between the energy storage device and the vehicle drive wheels and/or engine.

Engine 10 may be a multi-cylinder internal combustion engine, one cylinder of which is depicted in detail at FIG. 1. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of propulsion system 10 via an intermediate transmission system. Combustion cylinder 30 may receive intake air from intake manifold 45 via intake passage 43 and may exhaust combustion gases via exhaust passage 48. Intake manifold 45 and exhaust passage 48 can selectively communicate with combustion cylinder 30 via respective intake valve 52 and exhaust valve 54. In some embodiments, combustion cylinder 30 may include two or more intake valves and/or two or more exhaust valves.

Engine 10 may optionally include cam position sensors 55 and 57. However, in the example shown, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. To enable detection of cam position, cam actuation systems 51 and 53 may have toothed wheels. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 43 in a configuration that provides what is known as port injection of fuel into the intake port upstream of combustion cylinder 30.

Intake passage 43 may include a charge motion control valve (CMCV) 74 and a CMCV plate 72 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 43 may include a mass air flow sensor 120 and a manifold air pressure sensor 122 for providing respective signals MAF and MAP to controller 12.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOR, HC, or CO sensor. The exhaust system may include light-off catalysts and underbody catalysts, as well as exhaust manifold, upstream and/or downstream air/fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 109, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; in some examples, a profile ignition pickup signal (PIP) from Hall effect sensor 118 (or other type) coupled to crankshaft 40 may be optionally included; throttle position (TP) from a throttle position sensor; and absolute manifold pressure signal, MAP, from sensor 122. The Hall effect sensor 118 may optionally be included in engine 10 because it functions in a capacity similar to the engine laser system described herein. Storage medium read-only memory 106 can be programmed with computer readable data representing instructions executable by processor 102 for performing the methods described below as well as variations thereof.

Laser system 92 includes a laser exciter 88 and a laser control unit (LCU) 90. LCU 90 causes laser exciter 88 to generate laser energy. LCU 90 may receive operational instructions from controller 12. Laser exciter 88 includes a laser oscillating portion 86 and a light converging portion 84. The light converging portion 84 converges laser light generated by the laser oscillating portion 86 on a laser focal point 82 of combustion cylinder 30. In one example, light converging portion 84 may include one or more lenses.

A photodetector 94 may be located in the top of cylinder 30 as part of laser system 92 and may receive return pulses from the top surface of piston 36. Photodetector 94 may include a camera with a lens. In one example, the camera is a charge coupled device (CCD). The CCD camera may be configured to detect and read laser pulses emitted by LCU 90. In one example, when the LCU emits laser pulses in an infra-red frequency range, the CCD camera may operate and receive the pulses in the infra-red frequency range. In such an embodiment, the camera may also be referred to as an infrared camera. In other embodiments, the camera may be a full-spectrum CCD camera that is capable of operating in a visual spectrum as well as the infra-red spectrum. The camera may include a lens for focusing the detected laser pulses and generating an image of the interior of the cylinder. In one example, the lens is a fish-eye lens that creates a wide panoramic or hemispherical image of the inside of the cylinder. After laser emission from LCU 90, the laser sweeps within the interior region of cylinder 30 at laser focal point 82. Light energy that is reflected off of piston 36 may be detected by the camera in photodetector 94. Photodetector 94 may also capture images of the interior of the cylinder, as elaborated below.

Laser system 92 is configured to operate in more than one capacity with the timing of each operation based on engine position of a four-stroke combustion cycle. For example, laser energy may be utilized for igniting an air/fuel mixture during a power stroke of the engine, including during engine cranking, engine warm-up operation, and warmed-up engine operation. Fuel injected by fuel injector 66 may form an air/fuel mixture during at least a portion of an intake stroke, where igniting of the air/fuel mixture with laser energy generated by laser exciter 88 commences combustion of the otherwise non-combustible air/fuel mixture and drives piston 36 downward. Furthermore, light generated during the cylinder combustion event may be used by photodetector 94 for capturing images of an interior of the cylinder. As elaborated at FIG. 4, the generated images may then be used to diagnose cylinder combustion.

In a second operating capacity, LCU 90 may deliver low powered pulses to the cylinder. The low powered pulses may be used to determine piston and valve position during the four-stroke combustion cycle. In addition, upon reactivating an engine from idle-stop conditions, laser energy may be utilized to monitor the position, velocity, etc. of the engine in order to synchronize fuel delivery and valve timing. Furthermore, light generated by the laser light pulse emission at the lower power may be used for capturing images of an interior of the cylinder before a cylinder combustion event occurs, such as during an intake stroke.

The images generated at photodetector 94 may be displayed to a mechanic or service technician on a center-console of the vehicle so that they can perform a visual inspection and identify exhaust soot formation. For example, the laser ignition device, coupled to photodetector 94, may transmit light pulses into cylinder 30 while photodetector 94, including an infrared camera equipped with a fish-eye lens, generates images that are transmitted wirelessly to an engine controller and viewed on the display of the vehicle. In some examples, as discussed with reference to FIG. 2, while operating the laser ignition device, an operator controlled knob on the center-console can adjust the engine position. These adjustments include turning the engine forwards or backwards from an initial engine position allowing for further inspection of the cylinder for analyzing where most of the soot is being deposited or generated.

LCU 90 may direct laser exciter 88 to focus laser energy at different locations depending on operating conditions. For example, the laser energy may be focused at a first location away from cylinder wall 32 within the interior region of cylinder 30 in order to ignite an air/fuel mixture. In one embodiment, the first location may be near top dead center (TDC) of a power stroke. Further, LCU 90 may direct laser exciter 88 to generate a first plurality of laser pulses directed to the first location, and the first combustion from rest may receive laser energy from laser exciter 88 that is greater than laser energy delivered to the first location for later combustions. As another example, the laser energy may be focused at a second location to sweep across the cylinder cavity to illuminate any soot particles present in order to diagnose excess soot formation.

Controller 12 controls LCU 90 and has non-transitory computer readable storage medium including code to adjust the location of laser energy delivery based on temperature, for example the ECT. Laser energy may be directed at different locations within cylinder 30. Controller 12 may also incorporate additional or alternative sensors for determining the operational mode of engine 10, including additional temperature sensors, pressure sensors, torque sensors as well as sensors that detect engine rotational speed, air amount and fuel injection quantity. Additionally or alternatively, LCU 90 may directly communicate with various sensors, such as temperature sensors for detecting the ECT, for determining the operational mode of engine 10.

As described above, FIG. 1 shows one cylinder of multi-cylinder engine 10, and each cylinder may similarly include its own set of intake/exhaust valves, fuel injector, laser ignition system, etc.

The controller 12 receives signals from the various sensors of FIG. 1 and employs the various actuators of FIG. 1 to adjust engine operation based on the received signals and instructions stored on a memory of the controller. For example, based on input from the sensors and the images generated by the photodetectors, the controller may infer excess soot formation and mitigate further soot generation by adjusting a pulse-width commanded to a direct fuel injector. For example, the controller may reduce the pulse-width to reduce a degree of enrichment applied during fuel injection for cylinder temperature control.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

FIG. 2 illustrates an example embodiment 200 of how laser system 92 (of FIG. 1) may emit laser pulses into cylinder 30 so that a photodetector of the laser system can capture images of the interior of the cylinder. The images may be displayed to a vehicle operator to enable visual inspection of the cylinder for excess soot generation. As such, components already introduced in FIG. 1 are not re-introduced in FIG. 2.

FIG. 2 shows laser system 92 that includes laser exciter 88, photodetector 94 and LCU 90. LCU 90 causes laser exciter 88 to generate laser energy. High frequency laser pulses are directed towards various locations of the cylinder to scan as much of the cylinder as possible. For example, laser pulses 202 may be directed towards cylinder walls 215, interior of cylinder 30, piston top surface 213 and inner surface of valves 52 and 54 (that is, the surface facing the cylinder). By scanning as much of the cylinder as quickly as possible, laser pulse 202 acts as a wide beam light source or light bulb enabling photodetector 94 (in particular, the CCD camera) to capture images 220 of the interior of the cylinder. As such, when operating as a light source for image capture during diagnostics, the laser ignition system (or laser device) may be considered to be operating in a projector or illuminator mode, and LCU 90 may receive operational instructions, such as a power mode, from controller 12. When operating in the diagnostic mode, the laser system 92 may emit a series of low power pulses at high frequency. In comparison, during ignition, the laser may be pulsed quickly with high energy intensity to ignite the air/fuel mixture. In one example, during the diagnostic mode, the laser may be pulsed at the low energy level with a frequency-modulation having a repetitive linear frequency ramp. The low power frequent laser pulses may be emitted in the infra-red spectrum. A photodetection system, which includes a CCD camera operating in the infra-red spectrum (e.g., an infra-red CCD camera) with a fish-eye lens, may be located in the top of the cylinder as part of the laser and may capture cylinder images 320 using the light energy reflected off the interior of the cylinder. The captured images may include images of the cylinder walls 215, cylinder-facing surface of intake and exhaust valves 52 and 54, piston top surface 213 and the interior of cylinder 30. The captured images 220 are transmitted wirelessly by photodetector 94 to controller 12 for viewing on display 135 in a vehicle's center-console 140. Center-console 140 may be included on a vehicle dashboard inside a vehicle cabin of the hybrid propulsion system 10 of FIG. 1. Center-console 140 may be a control-bearing surface located in a central part of the vehicle cabin, in particular, in the front of the vehicle cabin. Center-console 140 may include various controls, such as knobs 138, dials 142, and buttons 136. The various controls may be actuated by a vehicle operator to adjust cabin conditions. The various controls may include, for example, a volume control knob 138 coupled to a music system of the vehicle for adjusting a volume of music in the cabin, a tuning button 136 coupled to a radio system of the vehicle for adjusting radio channel selection, and a temperature controlling dial 142 coupled to the vehicle's HVAC system for adjusting cabin heating and cooling temperatures.

The center-console 140 may also include a display 135. The display may be a touch-sensitive display that enables the vehicle operator to select settings of the vehicle via touch interactions. The display may also be used to display current vehicle settings. In addition, the display may be used to display a navigation system, such as GPS, phone capabilities, or web applications to be accessed during travel. During conditions when the laser ignition device is operated in to capture images for diagnostic purposes, display 135 may be used to depict images of the inside of cylinder 30 which are taken by photodetector 94 coupled to a laser detection system 92. Specifically, images of the interior of the cylinder taken by a CCD camera of the laser detection system are transmitted, for example wirelessly, to the engine control system and displayed on display 135 to a vehicle operator (e.g., a mechanic). Based on an operator display preference selected via touch interactions on the display, images of the cylinder interior of any or all the cylinders may be displayed.

In some examples, during the diagnostic mode, one or more of knobs 138 may be activated for engine position control (and deactivated for cabin control). For example, when operating in a diagnostic mode for assessing cylinder soot generation, the volume control knob may be activated for engine position control and deactivated for volume control. Consequently, adjustments to the volume control knob 138 can be used to adjust the engine position from an initial engine position to assist in the visual inspection of the cylinder. For example, it may be determined that the piston of the cylinder is positioned at or near a top of the cylinder currently displayed on display 135, obstructing a full view of the interior of the cylinder. To improve the view, the vehicle operator may slowly turn the volume control knob (e.g., clockwise or counterclockwise) which in turn moves the engine position (e.g., backwards or forwards) such that the piston is slowly moved towards the bottom of the cylinder via adjustments to a power-split generator/motor of the engine system. In embodiments where the engine includes a planetary gear transmission, the motor may hold the outer ring still (which keep the tire wheels still), while the generator (or sun gear), rotates the engine using feedback from either a resolver of the generator position, or using the 60-2 crank wheel with hall-effect sensor position system for actual engine position feedback. This movement of the piston may allow the operator to receive images representing a more complete view of the interior of the cylinder, and enable him to make a more precise inspection of locations where soot may accumulate. Further, during the diagnostic mode, the same volume control knob, or an alternate center-console knob, dial, or button may be activated to enable the image of the cylinder displayed on display 135 to be magnified (e.g., zoomed in to or out of).

In one example, the low power light pulses may be emitted in the infra-red (IR) spectrum by the laser ignition device and the CCD camera may be configured to operate in the IR spectrum. In alternate embodiments, photodetector 94 may have a full-spectrum CCD camera that can be tuned to coordinate with the frequency of the laser; thus, the camera can operate in IR and other spectrums of light (e.g. daylight or light bulbs) and has the capability to disable the laser if non-IR light is detected. Upon observing the images, the vehicle operator (e.g., a service technician or mechanic) can actively make adjustments to a position of the piston in order to better view the cylinder. For example, during conditions where images 220 indicate that the piston is near a top of the cylinder (e.g., at TCD), additional adjustments allow for the engine to be tuned slowly and precisely in order to move the piston down to the bottom of the cylinder. In the depicted example, when the piston is near the top of the cylinder in view, the operator can adjust volume control knob 138 located on the vehicle's center-console 140, in order to turn the engine forward or backwards from an initial engine position. If the engine is turned backwards from the initial engine position to move the piston downwards, the controller may concurrently open an intake throttle of the engine to reduce expansion of the intake manifold.

Figure 4:
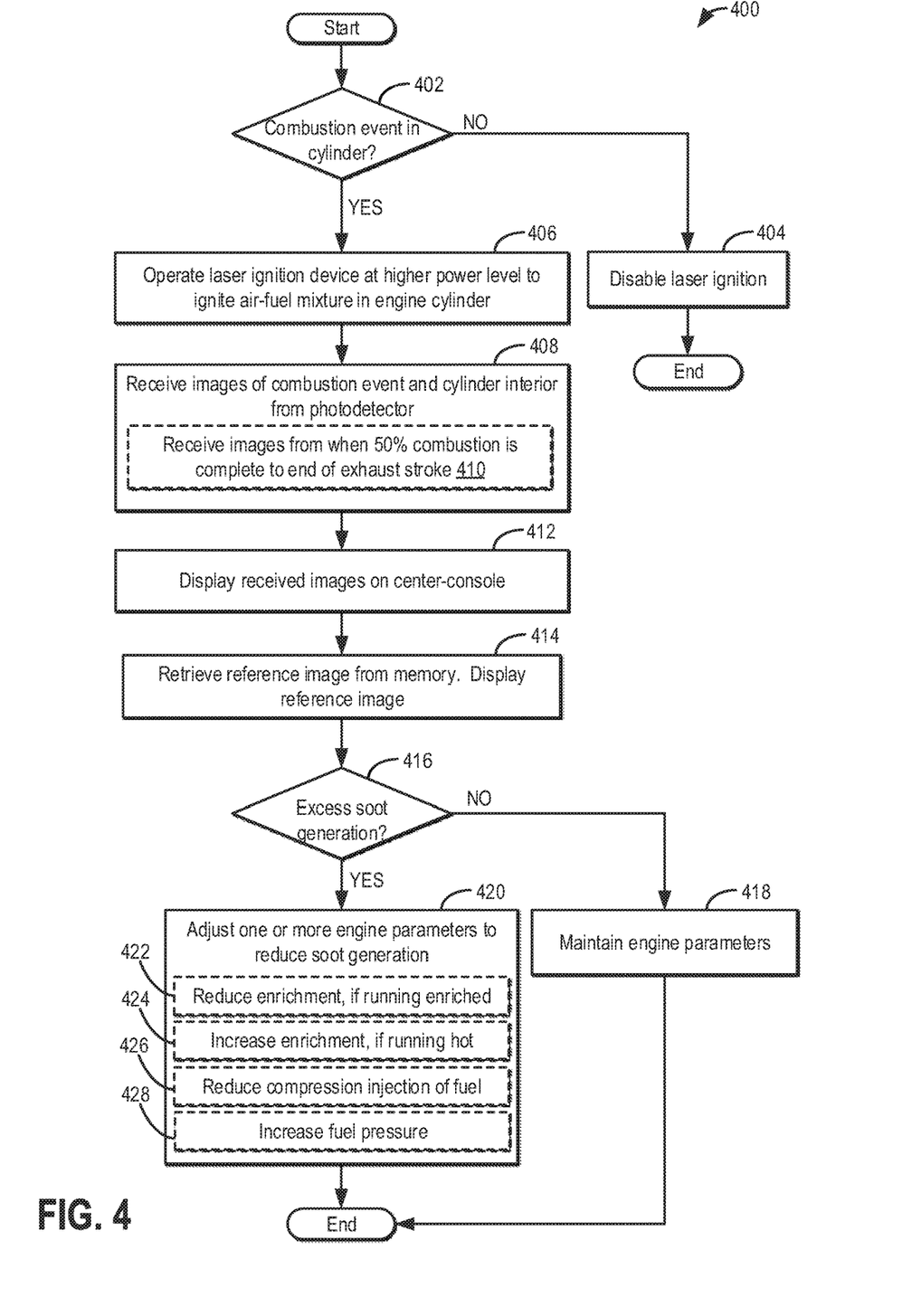
FIG. 4 shows a high level flow chart of a method for diagnosing excess soot formation based on in-cylinder images generated by a photodetector of a laser ignition system.

As elaborated at FIG. 4, the images of the interior of the cylinder may be analyzed to assess carbon build-up in the cylinder. For example, the amount of soot generated as well as the location of soot build-up may be assessed. Thus, based on the images, it may be determined if there is excessive soot generation. In response to the excess soot generation, a diagnostic code may be set. The controller may also direct the engine to reduce a degree of richness of fuel injection to reduce further soot generation. As another example, the controller may run the engine leaner than stoichiometry for a period of time or direct the laser to burn-off areas with excessive carbon build-up to address the elevated cylinder soot levels.

FIGS. 3A-3B show example operations of the laser system 92. LCU 90 causes laser exciter 88 to generate a low powered laser pulse shown at 302, which may be directed towards top surface 313 of piston 36. After emission, the light energy may be reflected off of the piston and detected by the photodetector 94. LCU 90 may receive operational instructions, such as a power mode, from controller 12. For example, during ignition, the laser pulse used may be pulsed quickly with high energy intensity to ignite the air/fuel mixture. Conversely, to determine the engine position, the controller may direct the laser system to sweep frequency at low energy intensity to determine piston position and identify one or more valve positions. For instance, frequency-modulating a laser with a repetitive linear frequency ramp may allow a determination of one or more piston positions in an engine. A detection sensor 94 may be located in the top of the cylinder as part of the laser system and may be calibrated to receive return pulse 304 reflected from top surface 313 of piston 36.

FIGS. 3A-3B illustrate how laser system 92 may emit pulses in the direction of piston 36 in cylinder 30 described above with reference to FIG. 1. Pulses emitted by laser system 92, e.g., pulse 302 shown in FIG. 3A, may be directed toward a top surface 313 of piston 36. Pulse 302 may be reflected from the top surface of the piston and a return pulse, e.g., pulse 304, may be received by laser system 92, which may be used to determine a position of piston 36 within cylinder 30.

In some examples, the location of the piston may be determined by frequency modulation methods using frequency-modulated laser beams with a repetitive linear frequency ramp. Alternatively, phase shift methods may be used to determine the distance. By observing the Doppler shift or by comparing sample positions at two different times, piston position, velocity and engine speed information (RPM measurement) may be inferred. The positions of intake valve 352 and/or exhaust valve 354 may also be determined using a laser system. When cylinder identity is combined with piston location, the position of the engine may be determined and used to synchronize fuel delivery and valve timing. Such positional states of the engine may be based on piston positions and CIDs determined via lasers.

Controller 12 may further control LCU 90 and include non-transitory computer readable storage medium including code to adjust the location of laser energy delivery based on operating conditions, for example based on a position of the piston 36 relative to TDC. Controller 12 may also incorporate additional or alternative sensors for determining the operational mode of engine 10, including additional temperature sensors, pressure sensors, torque sensors as well as sensors that detect engine rotational speed, air amount and fuel injection quantity as described above with regard to FIG. 1. Additionally or alternatively, LCU 90 may directly communicate with various sensors, such as Hall effect sensors 118, whose inclusion is optional, for determining the operational or diagnostic mode of engine 10.

A laser system may also be utilized to measure cam position by, for instance, blocking emitted pulses during certain strokes of the engine cycle. In one embodiment, laser system 92 may be located near intake valve 352 so a measurement of piston position within the cylinder is prevented during the intake stroke of the drive cycle. During the intake stroke, valve 352 opens into the chamber and blocks emitted laser pulses from reflecting off of the top surface of the piston 313. For example, in FIG. 3B, because laser system 92 is placed in close proximity to intake valve 352, when cylinder 30 is in its intake stroke, valve 352 opens into the chamber and blocks the laser pulse, e.g. laser pulse 306, from reaching the top surface of the piston 313. Controller 12 may still be programmed to interpret the signal detected in order to determine the positions of the cams. For instance, in this example the controller may process a lack of signal received by sensor 94 to indicate that intake valve 352 is in the open position. This information and the geometry of the engine may be further processed by the controller to determine the position of the engine within its drive cycle. Although FIG. 3B exemplifies how an emitted pulse may be blocked by intake valve 352, other configurations are possible. For instance, the laser system may be located in close proximity to the exhaust valve instead of the intake valve. When placed in this location, pulses emitted may instead be blocked during the exhaust stroke of the drive cycle. A controller can be calibrated to account for such differences. As described in detail below, controller 12 can process data collected during the drive cycle to determine engine position.

The difference in time between emission of light pulse 302 and detection of the reflected light pulse 304 by photodetector 94 can be further compared to a time threshold as a means of determining whether degradation of the laser device has occurred. For example, in an internal combustion engine, the combustion chamber may be three to four inches in length. Based on this estimate, and the speed of light in a vacuum ($c=3.0\times10^8$ m/s), a pulse of light emitted by laser system 92 reflected from the top surface of piston 313 may be detected in the picosecond time range. A time threshold well beyond the expected picosecond time range (e.g. 1 nanosecond) may therefore be adopted as a reference to indicate degradation of the laser system. For example, a pulse emitted by laser system 92 whose detection by sensor 94 takes longer than 1 nanosecond may indicate a laser system out of alignment.

In some examples, engine system 20 may be included in a vehicle developed to perform an idle-stop when idle-stop conditions are met and automatically restart the engine when restart conditions are met. Such idle-stop systems may increase fuel savings, reduce exhaust emissions, noise, and the like. In such engines, engine operation may be terminated at a random position within the drive cycle. Upon commencing the process to reactivate the engine, a laser system may be used to determine the specific position of the engine. Based on this assessment, a laser system may make a determination as to which cylinder is to be fueled first in order to begin the engine reactivation process from rest. In vehicles configured to perform idle-stop operations, wherein engine stops and restarts are repeated multiple times during a drive operation, stopping the engine at a desired position may provide for more repeatable starts, and thus the laser system may be utilized to measure engine position during the shutdown (after deactivation of fuel injection, spark ignition, etc.) while the engine is spinning down to rest, so that motor torque or other drag torque may be variably applied to the engine, responsive to the measured piston/engine position, in order to control the engine stopping position to a desired stopping position. The piston position information of each cylinder can also be used to estimate crankshaft positions.

In another embodiment, when a vehicle shuts down its engine, either because the motor is turned off or because the vehicle decides to operate in electric mode, the cylinders of the engine may eventually stop in an uncontrolled way with respect to the location of the piston 36 in combustion cylinder 30 and the positions of intake valve 352 and exhaust valve 354. For an engine with four or more cylinders, there may always be a cylinder located between exhaust valve closing (EVC) and intake valve closing (IVC) when the crankshaft is at rest.

As described above, a laser system may be used to measure valve positions as well as the position of a piston within a cylinder chamber. For example, in the engine position shown in FIG. 3B, light from laser system 92 may be at least partially blocked from reaching the top of piston 313 in cylinder 30. Because the amount of light reflected is reduced compared to the amount of light reflected off of the top surface of the piston when emitted pulses are not blocked, controller 12 may be programmed to account for such differences and use the information to determine that intake valve 352 is open. Based on the order of valve operations within the drive cycle, controller 12 further determines that exhaust valve 354 is closed. Because the example given is based on a four cylinder engine, one of the cylinders will be in an intake stroke at all times. As such, the controller may be programmed to process data from all laser systems in order to identify a cylinder in its intake stroke. Based on this determination, and using the geometry of the engine, the position of the engine can be identified using the laser systems. Alternatively, as will be described in further detail below, a controller may also be programmed to process a series of measurements from a single laser detector coupled to a cylinder as a means of identifying the position of the engine.

The positions of the pistons in a cylinder may be measured relative to any suitable reference points and may use any suitable scaling factors. For example, the position of a cylinder may be measured relative to a TDC position of the cylinder and/or a BDC position of the cylinder.

In this way, the components of FIGS. 1-2 enable a hybrid vehicle system comprising: an engine including a cylinder; a direct injector for fueling the cylinder; an electric motor; a display device in a cabin of the vehicle; a laser ignition system coupled to a cylinder head and configured to direct light pulses into the cylinder; a photodetection system coupled to the laser ignition system and the cylinder for generating images of an inside of the cylinder using the light pulses from the laser ignition system, the photodetection system including a camera and a lens; and a controller. The controller may be configured with non-transitory memory and computer readable instructions for: operating the laser ignition system during a compression stroke to initiate cylinder combustion; capturing an in-cylinder image at the photodetection system during a power stroke and an exhaust stroke of the cylinder; comparing the generated image to a reference image retrieved from the controller's memory; estimating an amount of soot generated during the cylinder combustion based on the comparing; and adjusting a pulse-width commanded to the direct injector responsive to the estimated amount of soot exceeding a threshold, the adjusting based on an exhaust temperature and a combustion air-fuel ratio. The controller may include further instructions for adjusting an output of the electric motor when operating the laser ignition system to maintain a defined engine speed and load while generating the in-cylinder image, and wherein the reference image is selected based on the defined engine speed and load. In one example, adjusting the pulse-width includes: responsive to the estimated amount of soot exceeding the threshold while exhaust temperature is below a threshold temperature and the combustion air-fuel ratio being richer than stoichiometry, reducing the commanded pulse-width; responsive to the estimated amount of soot exceeding the threshold while exhaust temperature is above the threshold temperature and the combustion air-fuel ratio being richer than stoichiometry, raising the commanded pulse-width; and responsive to the estimated amount of soot exceeding the threshold while exhaust temperature is below the threshold temperature and the combustion air-fuel ratio being at stoichiometry, raising a fuel pressure and reducing the commanded pulse-width. The controller may include further instructions for: responsive to the estimated amount of soot exceeding the threshold after adjusting the pulse-width commanded to the direct injector, setting a diagnostic code and limiting engine torque output.

Now turning to FIG. 4, an example method 400 is shown for diagnosing excess soot generation in a cylinder using light from a high power laser pulse emitted by an engine laser ignition system, such as the laser system of FIG. 1. The method enables cylinder fueling to be adjusted responsive to an amount of soot generated in a cylinder, the amount estimated at a controller based on an image generated through a laser ignition device. Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, it is determined if a combustion event is expected in a cylinder. For example, it may be confirmed that the engine is running, fueled, and that one or more cylinder combustion events are anticipated. If a cylinder combustion event is not expected, than at 404, the laser ignition may be disabled.

If a cylinder combustion event is expected, then at 406, the method includes initiating cylinder combustion by operating a laser ignition device (e.g., the laser system of FIG. 1). This may include initially operating the laser ignition device at a higher power level, such as at a power level higher than a threshold power required for only illuminating an interior of the cylinder. Then, once cylinder combustion is initiated, for visualizing soot production, the laser ignition device may be operated at a lower power level, such as at a power level lower than a threshold required for initiating cylinder combustion. In one example, the controller may operate the laser ignition device at the higher power level during the compression stroke of the cylinder to initiate the cylinder combustion and then transition to operating the laser ignition device at the lower power level during the power stroke and exhaust stroke of the cylinder (where the combustion event took place) to visualize the soot formed from the combustion event. In addition, the laser ignition device may be operated to direct laser pulses into the cylinder to planar sweep the cylinder. The directing of the laser pulses (and the transitioning to the lower power level) may be initiated after a threshold percentage of combustion phasing is completed. For example, the sweep may be started during a power stroke of the cylinder, such as once 50% of the combustion phasing is completed, and continued until an exhaust stroke of the cylinder is completed. In one example, laser pulses may be directed into the cylinder to planar sweep the cylinder during each of a power stroke and exhaust stroke of the cylinder. For example, the laser pulses may be directed at the center of the cylinder to give a smooth, even, and completion combustion pattern within the entire cylinder starting from a point or line in the center and moving radially outwards to the walls, ending at the same instant. In addition, crevice spaces may get an additional hit. In this way, the light from the ignition flame may be used for analyzing the inside of the cylinder. By virtue of the laser rapidly sweeping the interior of the cylinder through the power stroke, cylinder combustion may be initiated and the cylinder may be illuminated, as if by a light bulb, using the light generated from cylinder combustion. The illumination may be used to capture images of the interior of the cylinder, thereby allowing an operator to observe and assess the interior of the cylinder. As such, since the flame may obscure the view of the cylinder interior during the combustion, the light bulb effect is provided only with low energy laser sweeping when the flame is complete.

In some embodiments, where the engine is coupled in a hybrid electric vehicle, the routine may include maintaining a reference engine speed and load during the operating of the laser ignition device via adjustments to an electric motor. This allows the engine speed and load to be precisely controlled to a predetermined condition, improving the accuracy and reliability of the results. It also reduces variability in test results due to changes in engine conditions.

At 408, the routine includes receiving in-cylinder images from the photodetector. Specifically, the photodetector may use the light generated from the cylinder combustion (following laser ignition) to capture images of the interior of the cylinder. The generated image is generated at the photodetector coupled to the laser ignition device. In one example, at 410, images start being received started during a power stroke of the cylinder, such as once 50% of the combustion phasing is completed, and continue being received until an exhaust stroke of the cylinder is completed. The captured images are then transmitted to the display device, for example, wirelessly.

At 412, the routine includes displaying the in-cylinder image(s), captured by the photodetector, to a vehicle operator on a vehicle display device. Herein, the vehicle operator may be, for example, a mechanic or service technician diagnosing the engine. For example, after each combustion event, the captured image may be automatically presented to the service technician for analysis. Alternatively, after every combustion event, an image of each laser sweep of each cylinder may be sent to the operator.

At 414, the controller may display a reference image to the vehicle operator on the display device. The reference image may be stored in, and retrieved from, the controller's memory. The reference image may represent the given cylinder with a threshold amount of soot at the current engine operating conditions (such as at the current engine speed-load condition). In one example, the reference image may have been previously generated by the photodetector during predetermined conditions, such as on a previous iteration of the given routine when less than threshold amounts of soot was generated in the cylinder. The reference image may be retrieved based on the engine speed-load condition at the time of the combustion event in the cylinder. Additionally, the reference image may be selected based on the generated image. Alternatively, the reference image may be retrieved and displayed following operator input received via the display device after display of the captured image(s) on the display device.

At 416, the routine includes receiving input from the vehicle operator (e.g., the service technician) regarding cylinder soot generation, the operator input based on the displayed in-cylinder image and reference image. For example, the operator may compare the displayed image to the reference image, and based on a discrepancy, the operator may indicate that excess soot generation has occurred on the most recent cylinder combustion event. As one example, the generated image may indicate that one particular cylinder is producing soot from running too rich due to an improper (e.g., oversized) fuel injector. As another example, the generated image may show that another cylinder has a damaged fuel injector which is not atomizing the fuel spray.

If operator input indicative of excess soot generation is not received, then at 418, engine operating parameters are maintained. In one example, if the engine was being operated richer than stoichiometry for engine component temperature control (e.g., exhaust temperature control), then at 418, the degree of richness may be maintained. In another example, if the engine was being operated at stoichiometry, the engine may be maintained at stoichiometry.

If operator input indicative of excess soot generation is received, then at 420, one or more engine operating parameters may be adjusted to reduce soot formation. Additionally, the controller may set a diagnostic code to indicate excess soot generation. Adjusting the one or more engine parameters may include, at 422, reducing a degree of enrichment if the engine was running enriched. In one example, the engine may have been operated richer than stoichiometry for engine component temperature control (e.g., exhaust temperature control to protect exhaust manifold components from over-heating). Responsive to the indication of excess soot formation, the degree of richness may be reduced. In one example, responsive to elevated cylinder soot levels, the exhaust temperature may be compared to a threshold. If the soot level is elevated and the exhaust temperature is above a first threshold, the degree of richness of the enrichment may be decreased. For example, if a particular cylinder is producing more soot than the others, a degree of richness of the given cylinder may be reduced while the degree of richness of one or more other cylinders may be increased to maintain the same richer than stoichiometric air-fuel ratio. This enables the engine to provide the same level of cooling to the catalyst as before the image capture. Alternatively, if all cylinders are producing excess soot during rich engine operation, the engine load can be simultaneously reduced along with the overall degree of richness to provide the same level of cooling to the catalyst.

Adjusting the one or more engine parameters may alternatively include, at 424, increasing a degree of enrichment if the engine was running hot. In one example, responsive to elevated cylinder soot levels, the exhaust temperature may be compared to a second threshold, higher than the first threshold. If the soot level is elevated and the exhaust temperature is above the first and the second threshold, the degree of richness of the enrichment may be increased to expedite exhaust temperature control. For example, if the engine was operating at stoichiometry, the engine may be transitioned to operating at richer than stoichiometry responsive to the elevated soot and elevated temperature condition. As another example, if the engine was operating richer than stoichiometry, a degree of richness of the enrichment may be increased responsive to the elevated soot and elevated temperature condition. For example, if a degree of richness was reduced to reduce soot formation and subsequently the exhaust temperature became excessively hot (e.g., higher than a threshold temperature), the degree of richness of the richer than stoichiometric operation may be temporarily restored to the required level or, alternatively, the engine load may be reduced to reduce the exhaust temperature.

Additionally or alternatively, at 426, adjusting the parameters includes reducing compression injection of fuel to the cylinder. Compression stroke injection can result in a larger fuel droplet size, making the injection more prone to sticking to a cylinder wall and generating more soot. Thus by reducing compression injection of fuel, soot formation may be reduced. For example, a split ratio of fuel direct injected to the cylinder in the compression stroke relative to the intake stroke may be retrieved, and responsive to the elevated soot levels, the split ratio may be adjusted to deliver more of the total fuel in the intake stroke relative to the compression stroke. Delivering more fuel in the intake stroke may include increasing a pulse width of an intake stroke direct injection while decreasing a pulse width of a compression stroke direct injection. Further, as the pulse width of the intake stroke direct injection increases, a number of intake stroke direct injections may be increased. In addition, if a pulse width limit is reached, a split ratio of fuel direct injected to the cylinder relative to port injected into the cylinder may be adjusted. For example, a larger portion of the total fuel amount may be delivered as a port injection and a smaller portion of the total fuel amount may be delivered as a direct injection. As another example, the controller may adjust a split ratio of fuel injection to the cylinder to decrease compression stroke fuel injection relative to intake stroke fuel injection, while maintaining a combustion air-fuel ratio.

Additionally or alternatively, at 428, adjusting the parameters includes increasing a fuel pressure. By increasing the fuel pressure, fuel atomization and vaporization is improved, reducing fuel droplet size and improving fuel combustion. By increasing the fuel pressure selectively responsive to elevated soot levels (instead of using elevated fuel pressure during all fuel injections), costs associated with elevated fuel pressure maintenance are reduced. For example, if a cylinder is running cooler than normal (or cooler than the others), and fuel atomization is not sufficient to avoid soot formation, the fuel pressure may be increased temporarily to avoid excessive soot formation, while only temporarily expending the additional energy required to increase the fuel pressure.

As such, the ignition energy of the laser may not much effect soot formation. However, the ignition timing may be advanced (if retarded from MBT) to increase the combustion temperature.

In this way, the controller may initiate combustion in the cylinder by operating the laser ignition device; generate an in-cylinder image after operating the laser ignition device using light generated via the cylinder combustion; display the generated image and the reference image to an operator on a vehicle display device; and then estimate the amount of soot generated in the cylinder via the combustion. If an exhaust temperature is lower than a threshold, the controller may decrease a degree of richness of a combustion air-fuel ratio in the cylinder. In comparison, if the exhaust temperature is higher than the threshold, the controller may increase the degree of richness of the combustion air-fuel ratio in the cylinder.

It will be appreciated that the various adjustments listed at 422-428 may also be applied in various combinations to provide synergistic benefits in further soot reduction. As one example, increasing the fuel pressure may further help with the enrichment. For example, reducing the enrichment (at 422) may generally increase the exhaust temperature, while reducing compression injection (at 426) may reduce the exhaust temperature. By performing both actions, the exhaust temperature can remain unchanged. Alternatively, reducing enrichment while leaving compression injection active may heat the exhaust faster if it is below a threshold temperature.

In some engine systems, such as those configured without a particulate matter filter, if the soot level remains higher than the threshold for an extended time, such as even after the adjustments discussed above are performed, the controller may set a diagnostic code to indicate excessive particulate matter generation. Responsive to the diagnostic code being set, engine output may be temporarily limited to reduce exhaust emissions.

In the above routine, the amount of soot is estimated based on input received from the operator following the displaying. However, it will be appreciated that while the above routine depicts the need for an operator to analyze the generated image(s) and indicate whether excess soot generation has occurred, in alternate embodiments, the analysis may be automated. For example, following image capture, the image may be automatically displayed on the display device, and the corresponding reference image may also be automatically displayed on the display device. The controller may then automatically compare the images, without requiring operator input, to determine if excess soot has been generated. The determination may be based on similarity of the images (that is, the generated image and the reference image) via a simpler, less computation intensive pixel comparison or an advanced, more computation intensive image analysis.

It will be further appreciated that while the above routine suggests the use of the laser system coupled to the engine for diagnostic purposes, in alternate examples, the laser system including the laser exciter, the lenses, and the photodetector, may be configured as a mobile laboratory tool. Therein, the laser system may be configured as a portable tool that can be coupled to any engine and used for analyzing the engine.

In one example, an engine controller may operate a laser ignition device to initiate combustion in, and illuminate an inside of, a cylinder; transmit an in-cylinder image of soot particles formed from the combustion generated after operating the laser ignition device to a vehicle display device, the image generated by a photodetector of the cylinder using light generated via the cylinder combustion; and based on input received from an operator regarding cylinder soot level relative to a threshold, adjust fuel injection amount and pressure. The adjusting may include, for example, responsive to the cylinder soot level exceeding the threshold while exhaust temperature is below a threshold temperature, reducing the fuel injection amount while operating the cylinder richer than stoichiometry; and responsive to the cylinder soot level exceeding the threshold while exhaust temperature is above the threshold temperature, increasing the fuel injection amount while operating the cylinder richer than stoichiometry. The adjusting may further include increasing the fuel pressure. Further still, the adjusting may include increasing a first split ratio of fuel directed injected in an intake stroke relative to a compression stroke of the cylinder; and decreasing a second split ratio of fuel directed injected relative to port injected into the cylinder. The controller may display a reference image selected based on the generated image on the vehicle display device, the reference image retrieved from a database of images previously generated via operating of the laser ignition device, wherein the input received from the operator is based on a comparison of the reference image relative to the generated image.

In this way, excess cylinder soot generation may be identified, in real-time, and addressed rapidly. As a result, exhaust soot levels may be controlled accurately without relying on expensive soot sensors. By relying on images captured via components of a laser ignition system, the engine controller may adapt to any level of soot production. Further, exhaust soot levels may be maintained within threshold without requiring closed loop control. By comparing images of cylinder soot formation to a reference image, soot detection can be automated. By using the laser of an existing laser ignition system to generate in-cylinder images, soot generation associated with each cylinder can be differentiated, allowing cylinder specific fueling adjustments to be used to reduce further soot formation. Overall, exhaust emissions and engine performance can be improved.

One example method comprises: adjusting cylinder fueling responsive to an amount of soot generated in a cylinder, the amount estimated at a controller based on an image generated through a laser ignition device. In the preceding example, additionally or optionally, the image is an in-cylinder image and wherein the amount estimated through the laser ignition device includes initiating combustion in the cylinder by operating the laser ignition device; generating the in-cylinder image after operating the laser ignition device using light generated via the cylinder combustion; displaying the generated image and a reference image to an operator on a vehicle display device; and estimating the amount of soot. In any or all of the preceding examples, additionally or optionally, the method further comprises selecting the reference image based on an engine speed-load condition at a time of the combustion in the cylinder. In any or all of the preceding examples, additionally or optionally, the amount of soot is estimated based on input received from the operator following the displaying. In any or all of the preceding examples, additionally or optionally, operating the laser ignition device includes operating the laser ignition device at a power higher than a threshold power required for only illuminating the cylinder to initiate cylinder combustion and then transitioning to operating the laser ignition device at a power lower than a threshold power required for initiating cylinder combustion. In any or all of the preceding examples, additionally or optionally, operating the laser ignition device includes directing laser pulses into the cylinder to planar sweep the cylinder during each of a power stroke and exhaust stroke of the cylinder. In any or all of the preceding examples, additionally or optionally, the directing of the laser pulses is initiated after a threshold percentage of combustion phasing is completed. In any or all of the preceding examples, additionally or optionally, the generated image is generated at a photodetector coupled to the laser ignition device, and wherein the reference image includes a reference image previously generated by the photodetector. In any or all of the preceding examples, additionally or optionally, adjusting cylinder fueling includes: if an exhaust temperature is lower than a threshold, decreasing a degree of richness of a combustion air-fuel ratio in the cylinder; and if the exhaust temperature is higher than the threshold, increasing the degree of richness of the combustion air-fuel ratio in the cylinder. In any or all of the preceding examples, additionally or optionally, adjusting cylinder fueling further includes increasing fuel injection pressure. In any or all of the preceding examples, additionally or optionally, adjusting cylinder fueling includes adjusting a split ratio of fuel injection to the cylinder to decrease compression stroke fuel injection relative to intake stroke fuel injection, while maintaining a combustion air-fuel ratio.

Another example method for an engine comprises: operating a laser ignition device to initiate combustion in, and illuminate an inside of, a cylinder; transmitting an in-cylinder image of soot particles formed from the combustion generated after operating the laser ignition device to a vehicle display device, the image generated by a photodetector of the cylinder using light generated via the cylinder combustion; and based on input received from an operator regarding cylinder soot level relative to a threshold, adjusting fuel injection amount and pressure. In the preceding example, additionally or optionally, the adjusting includes: responsive to the cylinder soot level exceeding the threshold while exhaust temperature is below a threshold temperature, reducing the fuel injection amount while operating the cylinder richer than stoichiometry; and responsive to the cylinder soot level exceeding the threshold while exhaust temperature is above the threshold temperature, increasing the fuel injection amount while operating the cylinder richer than stoichiometry. In any or all of the preceding examples, additionally or optionally, the adjusting further includes increasing the fuel pressure. In any or all of the preceding examples, additionally or optionally, the adjusting further includes: increasing a first split ratio of fuel directed injected in an intake stroke relative to a compression stroke of the cylinder; and decreasing a second split ratio of fuel directed injected relative to port injected into the cylinder. In any or all of the preceding examples, additionally or optionally, the method further comprises displaying a reference image selected based on the generated image on the vehicle display device, the reference image retrieved from a database of images previously generated via operating of the laser ignition device, wherein the input received from the operator is based on a comparison of the reference image relative to the generated image.

Another example hybrid vehicle system comprises: an engine including a cylinder; a direct injector for fueling the cylinder; an electric motor; a display device in a cabin of the vehicle; a laser ignition system coupled to a cylinder head and configured to direct light pulses into the cylinder; a photodetection system coupled to the laser ignition system and the cylinder for generating images of an inside of the cylinder using the light pulses from the laser ignition system, the photodetection system including a camera and a lens; and a controller with non-transitory memory and computer readable instructions for: operating the laser ignition system during a compression stroke to initiate cylinder combustion; capturing an in-cylinder image at the photodetection system during a power stroke and an exhaust stroke of the cylinder;

comparing the generated image to a reference image retrieved from the controller's memory; estimating an amount of soot generated during the cylinder combustion based on the comparing; and adjusting a pulse-width commanded to the direct injector responsive to the estimated amount of soot exceeding a threshold, the adjusting based on an exhaust temperature and a combustion air-fuel ratio. In the preceding example, additionally or optionally, the controller includes further instructions for: adjusting an output of the electric motor when operating the laser ignition system to maintain a defined engine speed and load while generating the in-cylinder image, and wherein the reference image is selected based on the defined engine speed and load. In any or all of the preceding examples, additionally or optionally, adjusting the pulse-width includes: responsive to the estimated amount of soot exceeding the threshold while exhaust temperature is below a threshold temperature and the combustion air-fuel ratio being richer than stoichiometry, reducing the commanded pulse-width; responsive to the estimated amount of soot exceeding the threshold while exhaust temperature is above the threshold temperature and the combustion air-fuel ratio being richer than stoichiometry, raising the commanded pulse-width; and responsive to the estimated amount of soot exceeding the threshold while exhaust temperature is below the threshold temperature and the combustion air-fuel ratio being at stoichiometry, raising a fuel pressure and reducing the commanded pulse-width. In any or all of the preceding examples, additionally or optionally, the controller includes further instructions for: responsive to the estimated amount of soot exceeding the threshold after adjusting the pulse-width commanded to the direct injector, setting a diagnostic code and limiting engine torque output.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a cylinder fueling responsive to an amount of soot generated in a cylinder, the amount of soot estimated at a controller based on an image generated through a laser ignition device, wherein adjusting the cylinder fueling includes adjusting a split ratio of a fuel injection to the cylinder to decrease a compression stroke fuel injection relative to an intake stroke fuel injection while maintaining a combustion air-fuel ratio, thereby reducing the amount of soot generated in the cylinder, wherein the intake stroke fuel injection is an intake stroke direct injection and the compression stroke fuel injection is a compression stroke direction injection, and wherein adjusting the split ratio comprises increasing a pulse width of the intake stroke direct injection while decreasing a pulse width of the compression stroke direct injection until a pulse width limit of the intake stroke direct injection is reached, and then increasing a first portion of a total amount of fuel injected to the cylinder via port injection relative to a second portion of the total amount of fuel injected to the cylinder via the compression stroke direct injection and the intake stroke direct injection.

2. The method of claim 1, wherein the image is an in-cylinder image and wherein the amount of soot estimated through the laser ignition device includes:
initiating a combustion in the cylinder by operating the laser ignition device;
generating the in-cylinder image after operating the laser ignition device using a light generated via the combustion in the cylinder;
displaying the generated in-cylinder image and a reference image to an operator on a vehicle display device; and
estimating the amount of soot.

3. The method of claim 2, further comprising selecting the reference image based on an engine speed-load condition at a time of the combustion in the cylinder.

4. The method of claim 2, wherein the amount of soot is estimated based on input received from the operator following the displaying.

5. The method of claim 2, wherein the operating of the laser ignition device includes operating the laser ignition device at a power higher than a threshold power required for only illuminating the cylinder to initiate the combustion and then transitioning to operating the laser ignition device at a power lower than a threshold power required for initiating a cylinder combustion to illuminate the cylinder.

6. The method of claim 5, wherein operating the laser ignition device includes, after initiating the combustion, directing laser pulses generated at the power lower than the threshold power into the cylinder to planar sweep the cylinder during each of a power stroke and an exhaust stroke of the cylinder.

7. The method of claim 6, wherein the directing of the laser pulses is initiated after a threshold percentage of combustion in the cylinder is complete.

8. The method of claim 2, wherein the generated in-cylinder image is generated at a photodetector coupled to the laser ignition device, and wherein the reference image includes a reference image previously generated by the photodetector.

9. The method of claim 1, wherein the adjusting of cylinder fueling includes:

if an exhaust temperature is lower than a threshold, decreasing a degree of richness of the combustion air-fuel ratio in the cylinder; and if the exhaust temperature is higher than the threshold, increasing the degree of richness of the combustion air-fuel ratio in the cylinder.

10. The method of claim 9, wherein the adjusting of cylinder fueling further includes increasing fuel injection pressure.

11. The method of claim 1, wherein adjusting includes:

responsive to a cylinder soot level exceeding a threshold soot level while an exhaust temperature is below a threshold temperature, reducing a fuel injection amount while operating the cylinder richer than stoichiometry; and responsive to the cylinder soot level exceeding the threshold soot level while exhaust temperature is above the threshold temperature, increasing the fuel injection amount while operating the cylinder richer than stoichiometry.

* * * * *